Patented Sept. 23, 1947

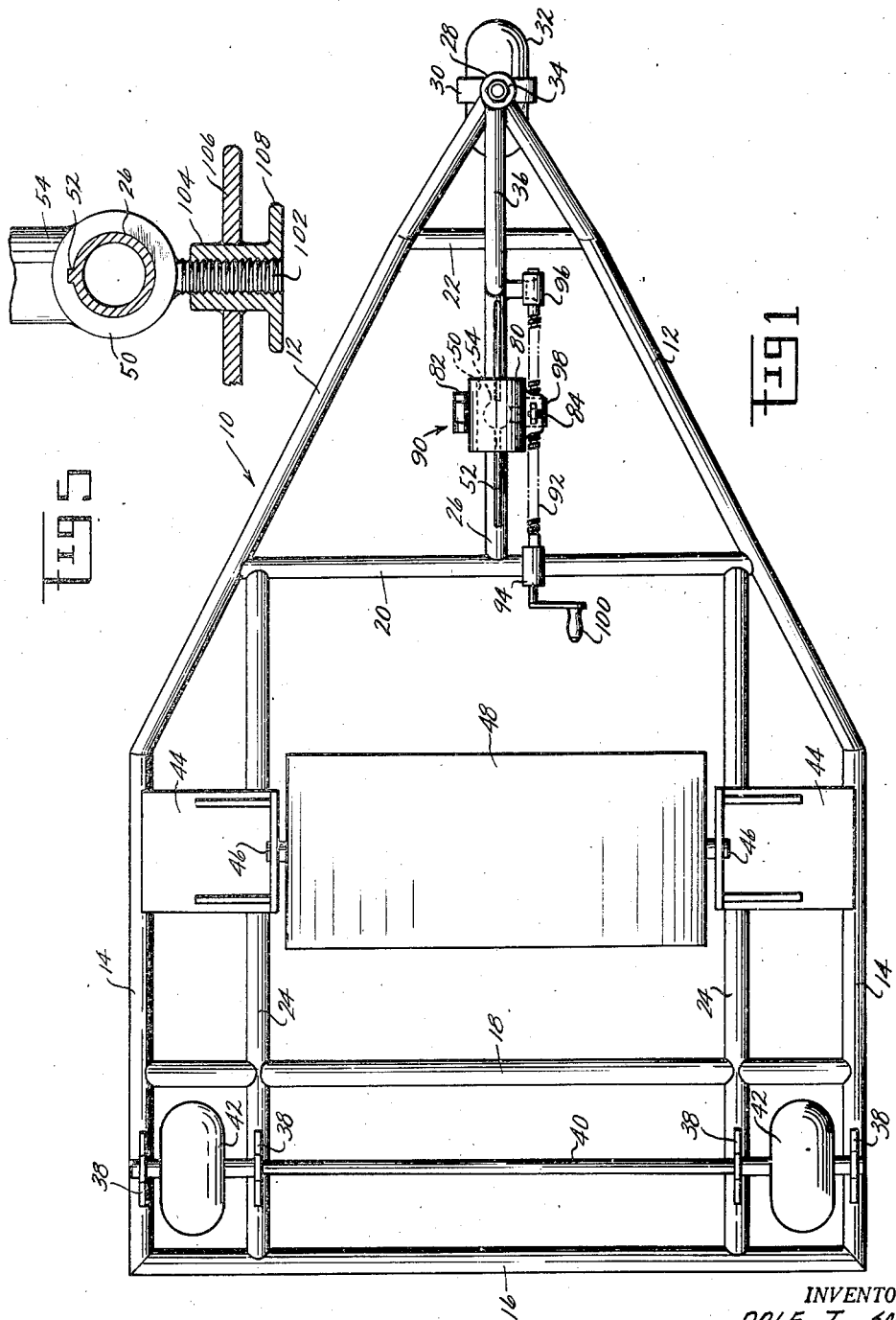

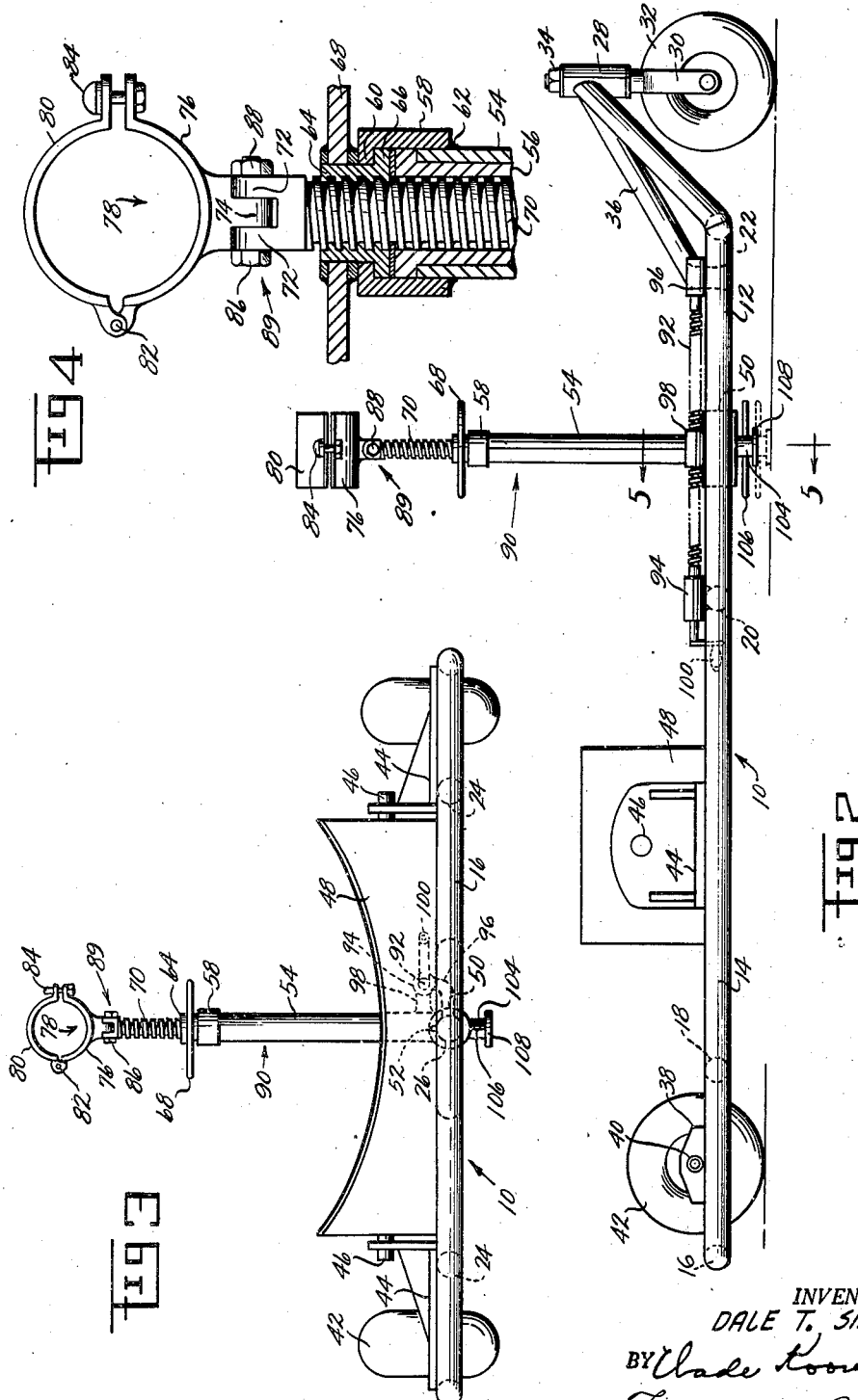

2,427,695

UNITED STATES PATENT OFFICE 2,427,695

PORTABLE ENGINE-MAINTENANCE STAND

Dale T. Smith, Anoka, Minn.

Application September 13, 1945, Serial No. 616,141

4 Claims. (Cl. 29—289)

(Granted under the act of March 3, 1883, as amended April 30, 1928; 370 O. G. 757)

The invention described herein may be manufactured and used by or for the Government for governmental purposes without payment to me of any royalty thereon.

This invention relates to apparatus for use in assembling or servicing aircraft engines, and is particularly adapted for radial engines.

Due to the considerable weight of engines of this class, it is extremely difficult, when they are removed from an aircraft and placed on an ordinary bench for servicing or repairing, to position them so as to make the portion which is to be worked on easily accessible yet securely fastened in the position selected.

It is therefore an object of this invention to provide apparatus upon which an engine of this kind may be placed with a selected side upward and with its axis horizontal or at any angle with the horizontal required in the process of making necessary repairs, adjustments or additions.

Another object is to so construct and arrange the adjustments of the apparatus as to take in a wide range of sizes of engines of this class.

Other objects and advantages will appear as the invention is further described with reference to the drawing, wherein:

Fig. 1 is a top plan view of the device.

Fig. 2 is a side elevation.

Fig. 3 is a rear end view of the device.

Fig. 4 is a detail, partly in section, of the clamp within which the propeller stub shaft is held.

Fig. 5 is a detail, partly in section, of the means to prevent rolling on the wheels.

Like reference characters refer to like parts throughout the several views.

A frame 10 is provided by welding together lengths of tubing 12, 14 and 16 with cross bracing 18, 20 and 22 and additional longitudinal braces 24 and 26. The front portion of the frame 10 which is of V shape is formed upwardly and joined to a short vertical tube 28 which provides rotative bearing for the journal which extends upwardly from the fork 30 of the guide wheel 32, the fork being held in place by the nut 34. A brace 36 extends from the tube 28 to the longitudinal brace 26.

Near the rear end of the frame 10, a series of ears 38 are welded to the upper side of the tubes 14 and 24 for supporting an axle 40 upon which the wheels 42 are freely rotatable. Further forward on tubes 14 and 24 two angle plates 44 are fastened and may be considered part of the framework 10. The vertical side of the angle plates are provided with openings to receive the trunnions 46 of the cradle 48 which is curved transversely of the frame to support a radial engine at its periphery, the size and curvature of the cradle being such as to support the range of sizes of engines which are to be worked on, and the cradle being adapted to rock on its trunnions 46 to point the engine nose either upward or downward from the horizontal as the nature of the work requires.

Slidable longitudinally on the tube 26 is a hub 50 which serves as a base for a pedestal jack. A long key 52 is welded to the upper side of the tube 26, the hub 50 being provided with a keyway which is slidable over the key, whereby the hub is prevented from rotation about the tube. A tubular pedestal 54 is secured to the upper side of the hub 50, the upper end of the pedestal tube (see Fig. 4) being provided internally with a press-fitted bushing 56 and provided externally with a collar 58 having an inturned flange 60, the collar 58 preferably being welded to the tube 54 as at 62.

An internally threaded hub 64 has an outwardly extending flange 66 which is freely rotatable under the inturned flange 60 of the collar 58. A handwheel 68 is welded or similarly secured to the hub 64. An externally threaded jackscrew 70 is fitted into the nut 64, whereby rotation of the handwheel 68 raises and lowers the jackscrew.

The upper end of the jackscrew is bifurcated to form ears 72 for receiving an ear 74 which extends downwardly from the lower half 76 of a clamping ring 78, the upper half 80 of the ring being hinged to the lower half 77 by a hinge pin 82. A bolt 84 brings the two halves 76 and 82 together for clamping the propeller stub shaft of an engine. A bolt 86 extends through the ears 72 and 74 and a nut 88 holds the bolt 86 in place, whereby the clamping ring 78 may rock on a hinged joint which may be broadly designated by the numeral 89. The jack, which includes an assembly of parts designated by numerals 54 through 88, may be broadly represented by the numeral 90.

The mechanism for moving the jack 90 longitudinally comprises a threaded rod 92 having, at one end, a bearing member 94, fast on the upper side of the tube 20, and, at the other end, a bearing member 96 extending laterally from the tube 26. A lug 98 which extends laterally from the pedestal 54 is internally threaded to receive the external threads of the rod 92. A crank 100 is provided for rotating the rod 92.

In order to keep the device from rolling on the wheels 32 and 42 while an engine is being worked on, a small jackscrew 102 extends downward from the bottom of the hub 50, screw 102 being provided with a nut 104 having a handle bar 106 or similar adjusting means attached whereby the enlarged end 108 of the nut may be pressed downward on the floor to prevent unwanted movement.

Procedure in using the apparatus is substantially as follows:

With the clamping ring 78 opened, and the pedestal jack 90 adjusted longitudinally to approximate position by means of the crank 100, an aircraft engine may be lowered into position on the cradle 48 by means of a crane with appropriate slings. The propeller stub shaft is then clamped on the clamping ring 78 and the jackscrew 70 is raised or lowered to the desired position, the joint 89 automatically adjusting itself as the angle at which the engine axis extends is above or below the horizontal. The weight of the engine holds it to the cradle which likewise swings on the trunnions 46 as the jackscrew 70 is raised or lowered. After the foregoing adjustments have been made, the hub 104 is screwed down on the small jackscrew 102 until part of the weight is taken from the wheels, whereupon the engine is ready to be serviced, repaired or otherwise worked on.

Having described an embodiment of my invention, I claim:

1. A portable engine-maintenance stand which comprises, in combination, a tubular framework of rectangular form at the rear end and of triangular form at the front end, a non-steerable wheel on each side of the frame at the rear end and a steerable wheel at the front end, a cradle supported on said framework having an arcuate upper surface corresponding to the periphery of a radial engine which is to be serviced, transverse trunnions for said cradle supported on said framework for rocking said cradle to point the nose of said engine either upward or downward from the horizontal, a guide member supported on said framework in the same vertical plane as passes through the axis of said arcuate surface, a jack pedestal having the lower end supported on said guide member for movement therealong, means to move said pedestal along said guide member, a jackscrew movable vertically in said pedestal, a clamping member carried on the upper end of said jackscrew for clamping the front of the engine, transverse hinge means for rocking said clamping member fore and aft on said jackscrew, means to raise and lower said jackscrew, and jack means adjustable downwardly from said framework for anchoring said stand against movement on said wheels.

2. A portable engine-maintenance stand which comprises, in combination, a tubular framework, a non-steerable wheel on each side of the frame at the rear end and a steerable wheel at the front end, a cradle on said framework having an arcuate upper surface corresponding to the periphery of a radial engine which is to be serviced, trunnions for said cradle supported on said framework for rocking said cradle on the axis transverse to its axis of curvature to point the nose of said engine either upward or downward from the horizontal, a longitudinal guide member supported on said framework in a plane passing through the said axis of curvature, a jack pedestal having the lower end supported on said guide member for movement therealong, means to move said pedestal along said guide member, a jackscrew movable vertically in said pedestal, a clamping member carried on the upper end of said jackscrew for clamping the front of the engine, transverse hinge means for rocking said clamping member fore and aft on said jackscrew, and means to raise and lower said jackscrew.

3. A portable engine-maintenance stand which comprises, in combination, a frame, wheels on said frame, a cradle having an upper surface corresponding to the periphery of an engine which is to be serviced, trunnions for said cradle having an axis transverse to the axis of the engine which is to be serviced supported on said frame for rocking said cradle to point the nose of said engine either upward or downward from the horizontal, a guide member supported on said frame in a plane passing through the axis of the engine which is to be serviced, a jack pedestal having the lower end supported on said guide member for movement therealong, means to move said pedestal along said guide member, a jackscrew movable vertically in said pedestal, means carried on the upper end of said jackscrew for clamping the front of the engine, transverse hinge means for rocking said clamping member fore and aft on said jackscrew on an axis parallel to said trunnion axis, and means to raise and lower said jackscrew.

4. A portable engine-maintenance stand which comprises, a frame, a cradle having an arcuate upper surface corresponding to the engine which is to be serviced, trunnions for said cradle on said frame for rocking said cradle on an axis crosswise of the engine axis to point the nose of said engine either upward or downward from the horizontal, a jack supported on said frame, means to move said jack in the direction of the engine axis, a jackscrew movable vertically in said jack, a clamping member carried on the upper end of said jackscrew for clamping the front of the engine, transverse hinge means for rocking said clamping member fore and aft on said jackscrew on an axis parallel to the trunnion axis, and means to raise and lower said jackscrew.

DALE T. SMITH.

REFERENCES CITED

The following references are of record in the file of this patent:

UNITED STATES PATENTS

| Number | Name | Date |
|---|---|---|
| 2,329,613 | Hokanson | Sept. 14, 1943 |
| 2,015,357 | Weaver | Sept. 24, 1935 |
| 1,559,391 | Waters | Oct. 27, 1925 |